July 28, 1936.  E. PIQUEREZ  2,048,947
MACHINE FOR CUTTING TRANSVERSE GROOVES
IN PNEUMATIC AND RESILIENT TIRES
Filed Jan. 25, 1935  6 Sheets-Sheet 1
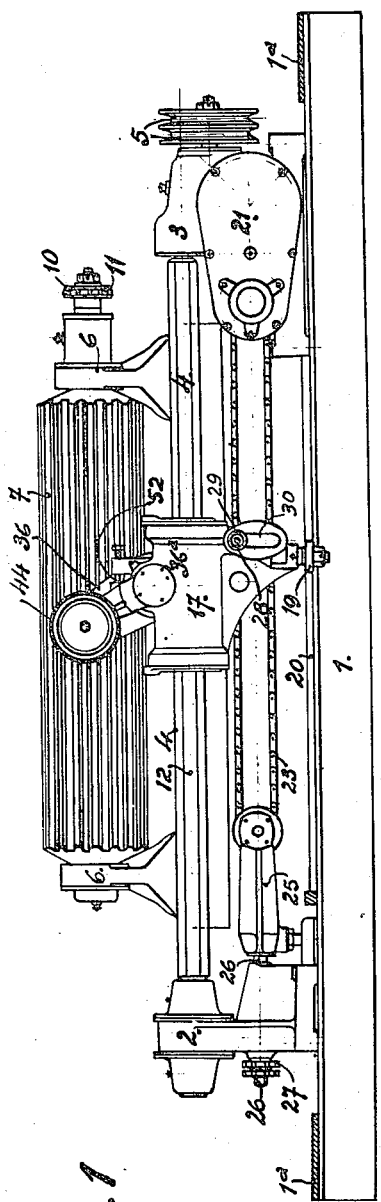
Inventor:
Emile Piquerez.
By Williams, Bradbury, McCalib & Hinkle
Attys.

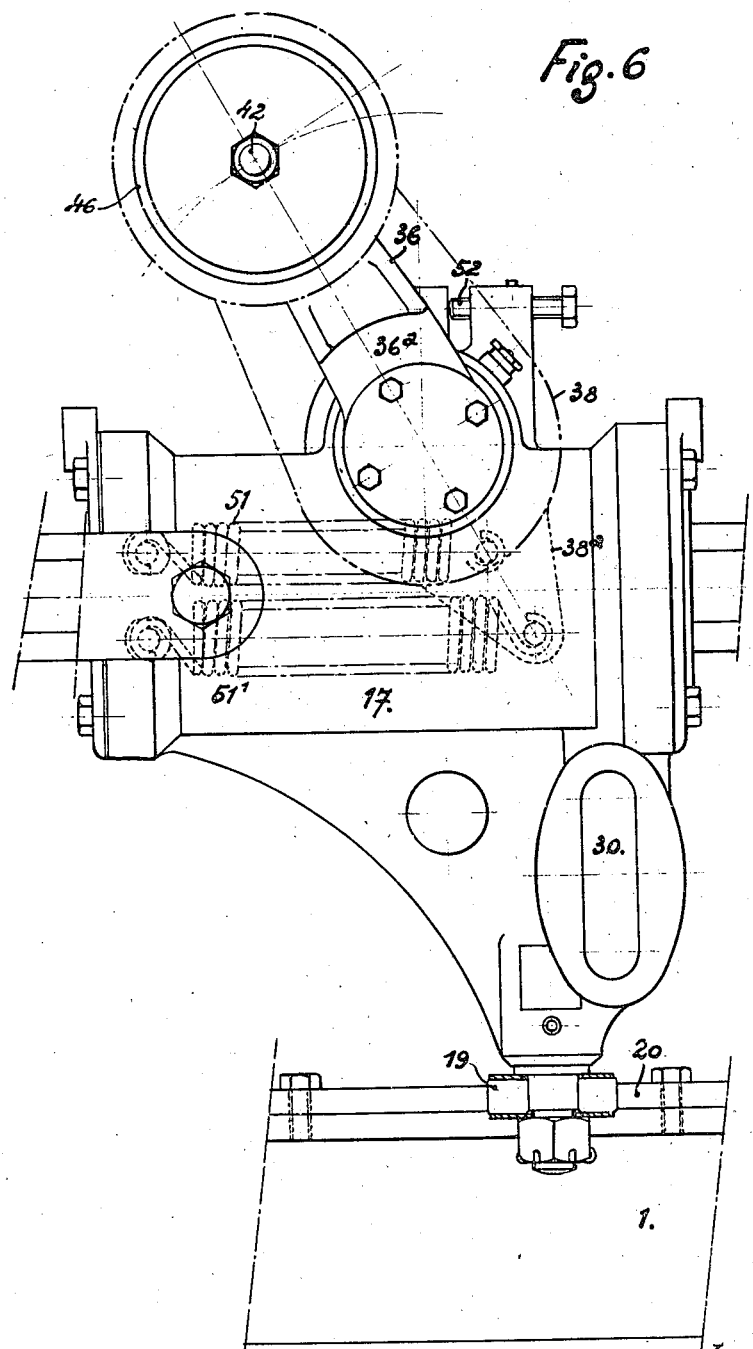

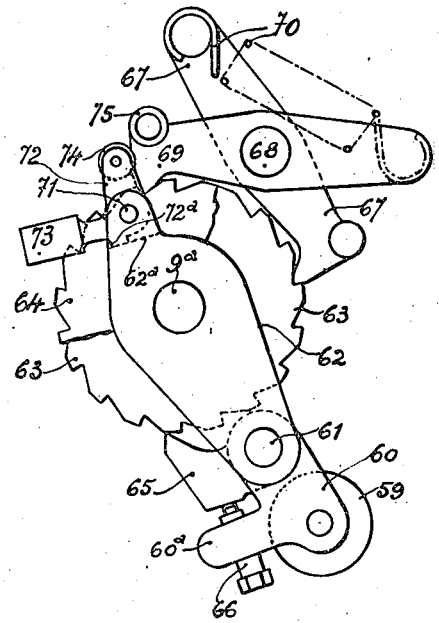
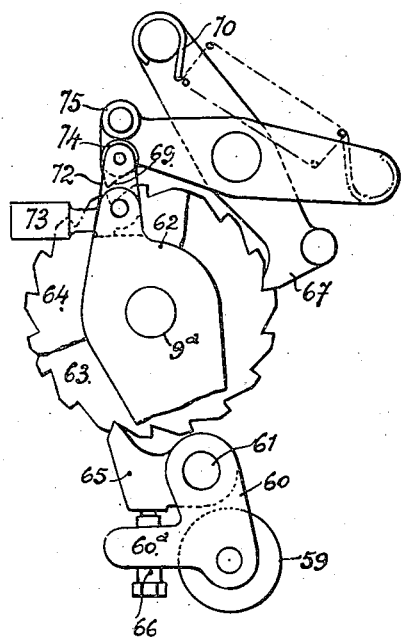
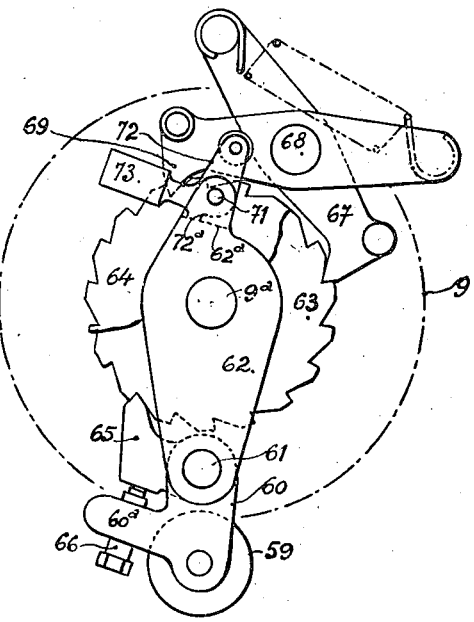

Patented July 28, 1936

2,048,947

UNITED STATES PATENT OFFICE 2,048,947

MACHINE FOR CUTTING TRANSVERSE GROOVES IN PNEUMATIC AND RESILIENT TIRES

Emile Piquerez, Paris, France

Application January 25, 1935, Serial No. 3,444
In France December 26, 1934

28 Claims. (Cl. 90—20)

This invention relates to a machine designed for cutting transverse grooves in pneumatic and resilient tires mounted upon the single or multiple wheels of a motor vehicle in order to increase their antiskidding qualities.

One of the objects of the present invention is to provide a machine of that kind which comprises one pair of cylindrical rollers designed to support the wheel or wheels, a rotary shaft in parallel with said two rollers, a carrier having a sliding reciprocating movement upon said shaft, an arm pivotally connected with said carrier, one or a plurality of cutters mounted upon said arm and rotatively actuated by said shaft, an elastic connection between said arm and the sliding carrier designed to cause the cutters to press elastically upon the tire or tires, a guide bearing upon the tire to limit the depth of penetration of the cutter and means to cause one of the rollers to rotate a predetermined angle according to the space between the grooves after every return of the movable tool carrier.

A particular object of the invention is to provide means for causing the sliding of the carrier upon the main shaft such that wedging is totally prevented notwithstanding the possible bending of the shaft at the moment when the cutters operate and that said sliding is accomplished with the least possible resistance, said means being preferably constituted by rollers mounted at both ends of the carrier and rolling by pairs in grooves provided in said shaft.

Another object of the invention is the provision of means for reciprocating the carrier upon the shaft, which will exert efforts strictly in parallel with said shaft, said means being devised in such a manner that they are capable of giving to the reciprocating movement a range which is greater than the width of a plurality of tires and preferably consist in two vertical endless chains operated in parallel with the shaft, on either side of the same, two opposite links of said chains being connected together by means of a rod passing through a vertical guide mounted upon the carrier, the depth of said guide being determined as a function of the vertical distance obtaining between the two sides of each chain.

Owing to this arrangement the wedging of the carrier upon the shaft resulting from the sliding drive is prevented. On the other hand said chain drive may be devised so as to give as wide a run as may be desired, thereby allowing more especially the cutting of grooves in double and triple twin tires of the largest sizes.

Another object of the invention is to provide means for adjusting at will the depth to which the cutters enter into the tires, said means comprising preferably a cylindrical guide having a diameter slightly smaller than that of the cutters and loosely mounted upon a ring engaged upon a fixed bearing which is eccentric relatively to the cutter shaft, so that the eccentricity of the guide relatively to the cutters and consequently the depth of the grooves which have been cut may be regulated beforehand by rotating said ring upon the bearing.

A further object of the invention is to provide means for locking one of the feed and tire supporting rollers in both directions when inoperative in such a manner that on the one hand when the vehicle is moved for coming out of the machine, the wheels are securely supported upon said roller and that on the other hand there is no danger of said roller being broken through reaction. Said means preferably consist in a pawl engaging a ratchet wheel which doubles a second ratchet wheel provided with inverted teeth relatively to those of the first ratchet wheel and actuated by the forward driving mechanism this second ratchet wheel being itself normally provided with a locking pawl and the forward driving mechanism comprising means for previously lifting the pawl of the first ratchet wheel which would otherwise prevent the forward movement.

Various other objects and advantages will appear as the description of the invention proceeds.

This invention will be best understood from a consideration of the following detailed description in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings,

Fig. 1 is a longitudinal elevation of the machine the front roller being taken out.

Fig. 2 is a plan view of the machine.

Fig. 6 is an outside elevation corresponding to Fig. 4.

Figs. 7, 8, and 9 are front views which illustrate the pawl and ratchet mechanism controlling the forward movement and the locking of the carrying rollers.

Figure 5:
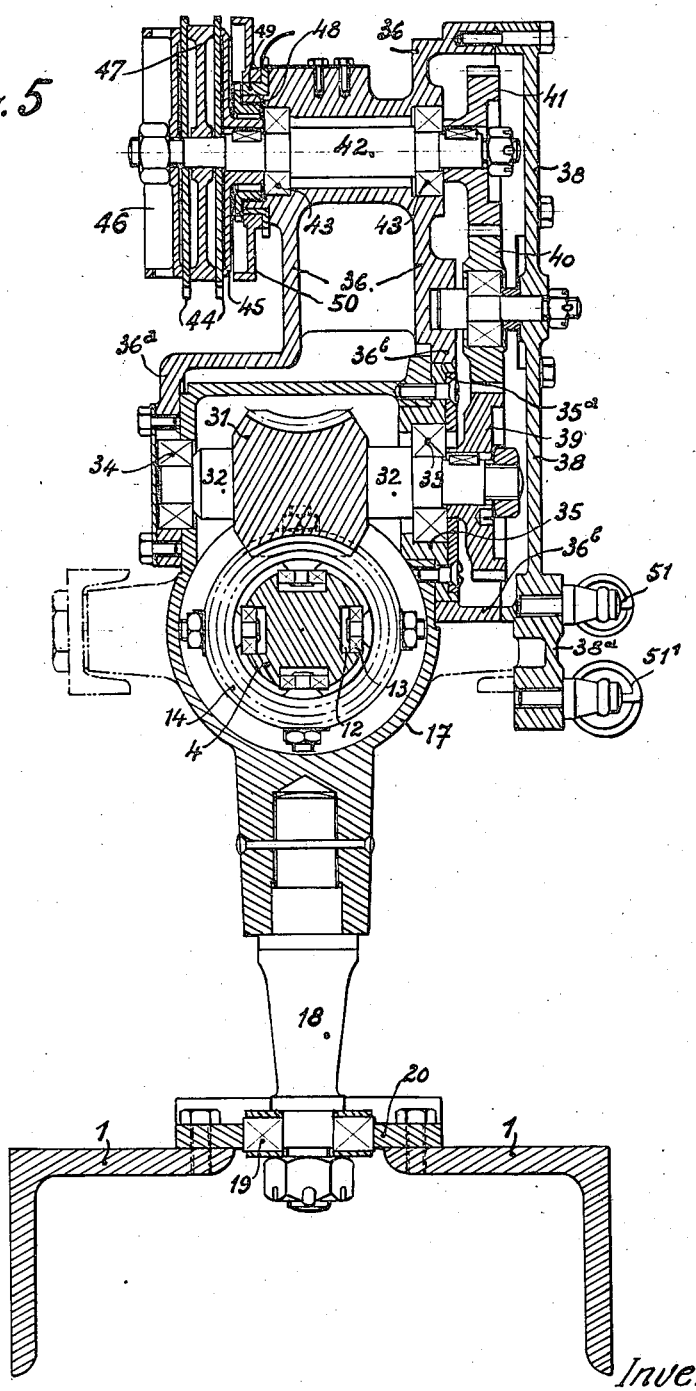
Fig. 5 is a sectional view drawn along the line 5—5—5 in Fig. 4.

As will be seen in the drawings, in the present mode of execution the machine comprises a middle frame 1, formed for example by two L-shaped longitudinal angle irons (Fig. 5) provided at both ends with stays 1ª upon which the bearings 2, 3 of a longitudinal shaft 4 are mounted, said shaft being provided at its ends with driving pulleys 5 rotated by a motor, not shown, placed outside the machine.

Two bearings 6, 6 carrying a cylindrical fluted roller 7, on the one part and two bearings 8, 8 for a second cylindrical fluted roller 9 similar to the first on the other part, are mounted on both sides of the middle frame.

The rollers 7 and 9 the axes of which are in parallel and also in parallel with the axis of the longitudinal shaft 4 are designed to support a single wheel or two or three twin wheels of a motor car provided with pneumatic or with resilient tires.

The pressure produced by the vehicle creates an adherence which is more than sufficient to produce the gradual rotation of the wheel or wheels caused by a gradual rotary movement of the roller 9 (the driving mechanism of which will be hereinafter described) which drives the roller 7 by means of a chain 10 and two spur pinions 11, 11 mounted upon the spindles of said rollers.

The middle shaft 4 which is placed between the rollers 7 and 9 is provided with four rectilinear longitudinal grooves 12, in each one of which travel two rollers 13 placed inside and at both ends of a hollow screw 14 engaged upon the shaft 4.

Owing to this arrangement the wedging of the screw upon the shaft is avoided even during the operation when said shaft is submitted to a bending stress.

The screw 14 which thus carries eight rollers is provided at both ends with two trunnions 15 rotating in bearings 16 provided at the end of a casing 17 which surrounds said screw. The casing 17 is the above described movable carrier.

The movable casing-carrier 17 is provided underneath with a vertical shank 18 carrying at its end a roller 19 which engages in a guide 20 formed upon the angle irons of the frame 1. Consequently the movable carrier is prevented from turning around the shaft 4 but may move along same; said movement being produced as follows: The shaft 4 drives by means of the reducing gears 21, 21 two spur wheels 22, 22 carrying two parallel chains 23 which pass upon another pair of wheels 24, 24 mounted upon the same fork shaped support 25 which is provided with a return screw 26 that passes through the base of the bearing 2 outside of which it is provided with an adjustment nut 27 and a lock nut and acts as a chain tensioning device. Two opposite links of the chains 23 are connected together by means of a transverse rod 28 carrying a roller or slide 29 which engages a vertical guide 30 provided in the lower part of the movable carrier 17. The depth of said guide is calculated as a function of the vertical distance between both sides of the chain in such a manner that the rod 28 may slide easily from one side of the chain to the other. By these means a reciprocating rectilinear movement is transmitted to the carrier 17 and the forces which are brought to bear upon it for this purpose are strictly in parallel with the shaft 4, this consequently preventing every possible wedging effect. On the other hand owing to this chain system the stroke of the carrier may be of any desired length and in the present case it is sufficient to allow for operation upon three twin wheels for heavy cars.

The screw 14 enclosed in the movable carrier 17 is in mesh with a helical pinion 31 the spindle 32 of which is supported in ball bearings 33, 34. The bearing 33 is mounted in the cover 35 of the carrier 17, and the bearing 34 is mounted in the opposite wall of said casing relatively to which it partly projects outside. Said bearing 34 thus constitutes a pivot for one member of the fork 36ª of an arm 36 of which the other member 36ᵇ is pivoted upon a bearing 35ª of the aforesaid cover 35.

The member 36ᵇ and the side of the arm 36 constitute a kind of casing closed by a cover 38, which encloses gears 39, 40, 41 the first being carried upon the spindle 32 of the helical pinion 31 and the last upon a spindle 42 rotating in bearings 43 and upon the end of which are mounted rotating cutters 44, two for example. Said cutters which are constituted by saws are clamped between two plates 45, 46, with a disk 47 interposed between them. An eccentric ring 49 upon which is loosely mounted a cylindrical roller guide 50 is mounted at the back of the cutters, said roller guide having a diameter which is slightly smaller than that of the cutters 44, it will easily be seen that by previously giving the desired direction to the eccentric 49, the withdrawal of the edge of the roller guide which engages the tire in which grooves are to be cut, is adjusted relatively to the saws and that consequently the depth of penetration of the latter will also be adjusted. It will be understood that the said saws are rotated by the following system: Shaft 4—screw 14—helical pinion 31—gears 39, 40, 41—spindle 42. It will also be seen that the arm 36 and the connected parts may turn relatively to the carrier 17 upon the vertical axis of the pinion 31 and of the toothed wheel 39, so that the transmission of the movement between said gears is always uninterrupted. Two springs 51, 51¹ shown in Fig. 6, which connect a shank 38ª provided at the bottom of the cover 38, with two stationary points of the carrier 17, located of course outside the pivotal joint serve to maintain the oscillating system 36—44—50 in its raised position and also to elastically press the cutters 44 against the tires in which the grooves are to be cut. The springs 51, 51¹ normally maintain the whole in a raised position which is determined by the engagement of the arm with an adjustable abutment 52 (provided upon the carrier 17 as shown in Figs. 1 and 6).

Said abutment is adjusted in such a manner that the cutters engage the edge of the tread band without coming in contact with the side of the tire when said tire is a pneumatic tire.

The mechanism which controls the forward displacement of the roller 9 that allows the transverse cutting of the grooves at regular distances upon the whole circumference of the tires will now be described.

Figure 3:
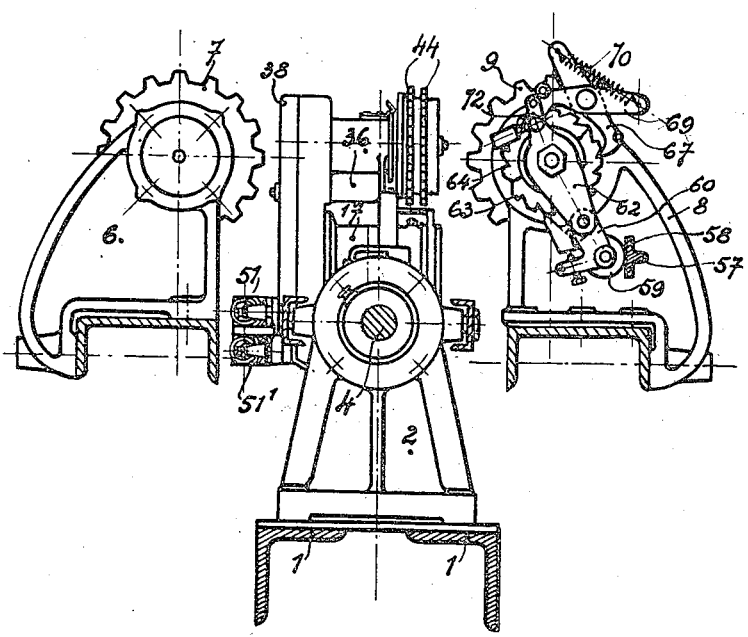
Fig. 3 is an end view taken from the left side of Fig. 2.
Figure 4:
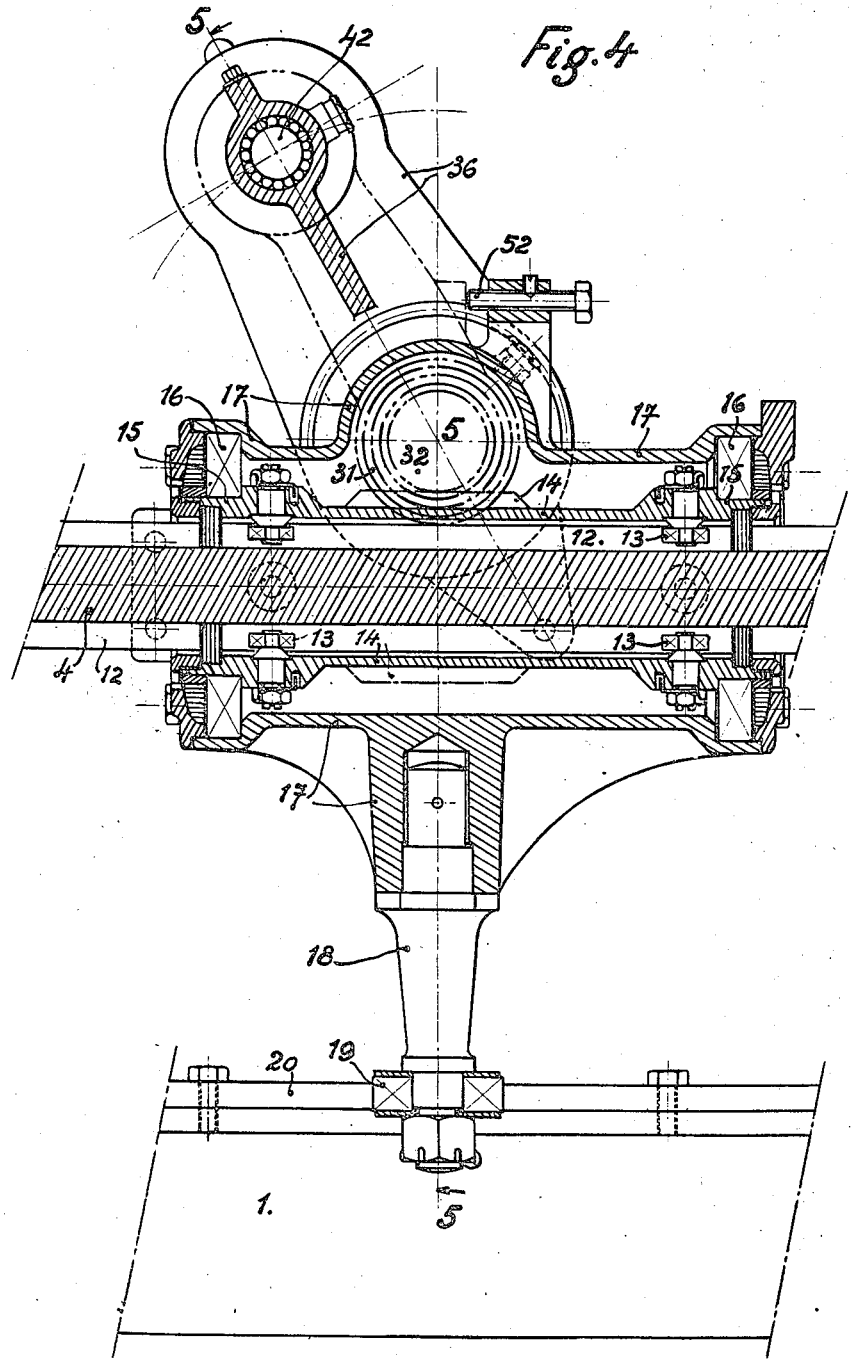
Fig. 4 is a vertical sectional view of the movable cutter carrier.

Referring to Fig. 2 of the appended drawings it will be seen that a roller guide 53 mounted upon the end of a lever 54 pivoted at 55 upon a bearing 56 is placed in the path of the movable carrier near the end of its run to the left. The lever 54 is provided with an arm 57 provided itself in its extremity with a flat head 58 which when inoperative (Fig. 2) is pressed against a roller 59, carried upon a lever 60 (Figs. 3 and 7) pivotally connected at 61 with another lever 62 centrally pivoted upon the spindle 9ᵃ of the roller 9.

Two ratchet wheels 63, 64 put in juxtaposition and provided with teeth which are similar but set in opposite directions one to the other are fixed upon the spindle 9ᵃ. A pawl 65 is provided upon the pivot of the levers 60 and 62 to cause the forward movement of the wheel 63 when acted upon by a catch constituted by a screw 66 which is mounted upon an arm 60ᵃ of the lever 60 and permits control of the system.

The ratchet wheel 63 is provided with a locking pawl 67 pivoting at 68 upon a stationary spindle carried upon the cheek of the bearing 8 of roller 9. Upon said spindle 68 is also pivoted a second pawl 69 which locks the wheel 64 and consequently normally prevents the advance of the wheel 63 connected with wheel 64 by means of the spindle 9ᵃ. The pawls 67 and 69 are kept in engagement with the teeth of said wheels by means of one and the same spring 70 which connects the ends of the pawls together.

On the other hand, at the end of the lever 62 is pivotally mounted at 71 a small lever 72 provided with a weight 73 and with a guide roller 74 which is designed to lift the pawl 69 provided also for this purpose with a guide roller 75. Under the action of the weight the lever 72 normally bears by the intermediary of a boss 72ᵃ upon a flange 62ᵃ of the lever 62.

Supposing that the movable carrier 17 travels from left to right, the mode of operation is as follows:

The two cutters engaging the tires cut therein two parallel grooves having a depth which is limited at all times by the cylindrical guide 50 that bears upon said tires and follows their outline this being made possible owing to the elastic suspension of the train of the arm 36. When the carrier has reached the end of its stroke to the right, it is returned by the rod 28 which has moved down to the bottom of the guide 30. During this return stroke the cutters pass over again in the grooves already cut then at the end of the stroke the carrier 17 comes in engagement with the roller 53 and thus causes the oscillation of the lever 54—57 which acts upon the roller 59 towards the left of Fig. 7 and consequently by means of the lever 60 causes the pawl 65 to slide upon one of the teeth of the ratchet 63 to the bottom of same. The lever 62 begins therefore to oscillate and consequently the roller 74 engages the guide roller 75 and lifts it thus disengaging the pawl 69 at the very moment when the pawl 65 reaches the bottom of the tooth (this position is illustrated in Fig. 8). The action upon the roller 59 being continued, the pawl 65 pushes the tooth of the ratchet wheel 63 thus rotating the roller 9 and consequently also the wheels with their tires in which the grooves are being cut and which are supported upon it, during this time the guide roller 74 passing beyond the guide roller 75 allows the pawl 69 to fall back in one of the teeth of the wheel 64 in the position indicated in Fig. 9.

At the moment when the guide roller 59 is no longer actuated the lever 62 swings in the opposite direction, the guide roller 74 passes under the guide roller 75 without raising it because the lever 72—73 can swing as it leaves the abutment 62ᵃ, the parts returning to the position shown in Fig. 7.

The movable carrier having moved again to the right, the cutters 44 will cut two new grooves in the tires and so on.

Owing to the double pawl and ratchet system which has just been described it will be understood that the roller 9 when inoperative will be effectively locked in both directions so that when at the end of the operation the vehicle will again be started the wheels will be positively supported upon the roller 9 whatever the direction of the movement may be and that the reaction of said roller which for one of the possible directions would act upon the advance pawl and ratchet system 65 will be taken up by the pawl 67 thus preventing all damage to the advance mechanism.

What I claim and desire to secure by Letters Patent of the United States is:

1. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires, means for limiting and controlling the depth to which the cutters enter into the tires, and means for rotating one of the rollers a predetermined angle after every return movement of the movable tool carrier according to the distance between the grooves.

2. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a carrier sliding upon said shaft and means for causing forces strictly parallel to said shaft to act upon said carrier in order to give it a rectilinear reciprocating motion having a range which is greater than the total width of the tires in which the groves are to be cut, cutters mounted upon said carrier in parallel with the rotary shaft and rotatively driven by said shaft, elastic means for pressing said cutters upon the tires, means for limiting and controlling the depth to which the cutters enter into the tires, and means for rotating one of the rollers a predetermined angle after every return movement of the moveable tool carrier according to the distance between the grooves.

3. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a carrier slidingly mounted upon said shaft, a vertical guide in said carrier, two vertical movable chains in parallel with said shaft, and a transverse horizontal rod connecting two links of said chains and passing through said guide in which it is guided; cutters mounted upon said carrier in parallel with the rotary shaft and rotatively driven by said shaft, elastic means for pressing said cutters upon the tires, means for limiting and controlling the depth to which the cutters enter into the tires, and means for rotating one of the rollers a predetermined angle after every return movement of the movable tool carrier according to the distance between the grooves.

4. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a carrier slidingly mounted upon said shaft, a vertical guide in said carrier, two vertical chains in parallel with said shaft, two driving chain wheels for said chains, two reducing driving gears between the rotary shaft and said driving wheels, two loosely mounted wheels for said chains, a carrier for said loosely mounted wheels, a return system for said carrier for tightening the chains, a transverse horizontal rod connecting two links of said chains and passing through the guide of the carrier in which it is guided; cutters mounted upon said carrier in parallel with the rotary shaft and rotatively driven by said shaft, elastic means for pressing said cutters upon the tires, means for limiting and controlling the depth to which the cutters enter into the tires, and means for rotating one of the rollers a predetermined angle after every return movement of the moveable tool carrier according to the distance between the grooves.

5. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, an arm pivoted with said carrier in a vertical plane upon a spindle perpendicular to the rotary shaft, a cutter carrier spindle in parallel with the aforesaid spindle and mounted upon said arm, circular cutters mounted upon said cutter carrier spindle, means for rotatively driving said cutters from said rotary shaft, elastic means for pressing said cutters upon the tires, means for limiting and controlling the depth to which the cutters enter into the tires and means for rotating one of the rollers a predetermined angle after every return movement of the movable tool carrier according to the distance between the grooves.

6. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, an arm pivotally mounted with said carrier in a vertical plane upon a spindle perpendicular to the rotary shaft; a cutter carrier spindle in parallel with the above spindle and mounted upon said arm, circular cutters mounted upon said cutter carrier spindle, springs connecting said arm to said carrier and positioned in such a manner as to raise said arm in order to elastically press the tools against the tires, means for rotatively driving said cutters from the rotary shaft, means for limiting and controlling the depth to which the cutters enter into the tires and means for rotating one of the rollers of a predetermined angle after every return movement of the movable tool carrier according to the distance between the grooves.

7. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said rollers interposed between them, an endless screw concentric with said shaft, rolling means, to ensure the centering of the screw upon said shaft and its being drawn along by same, a carrier for said screw sliding with it upon said shaft, means to prevent the rotary movement of said carrier, a pinion drawn along by said screw, a tool carrier spindle mounted upon said carrier, a set of gears between said pinion and the tool carrier spindle, circular cutters mounted upon said tool carrier spindle; elastic means for pressing said cutters upon the tires, means for limiting and controlling the depth to which the cutters enter into the tires and means for rotating one of the rollers a predetermined angle after every return movement of the movable tool carrier according to the distance between the grooves.

8. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said rollers and interposed between them, said shaft being provided with four longitudinal grooves, a hollow endless screw concentric to said shaft, guide rollers at both extremities inside said screw, said rollers being engaged by pairs in the grooves of the rotary shaft, a carrier for said screw, said carrier surrounding the screw and the shaft upon which it is movable consequently with the screw, a pinion drawn along by the screw, a tool carrier spindle mounted upon said carrier, a set of gears between said pinion and the tool-carrier spindle, circular cutters mounted upon said tool carrier spindle, elastic means for pressing said cutters upon the tires, means for limiting and controlling the depth to which the cutters enter into the tires and means for rotating one of the rollers a predetermined angle after every return movement of the movable tool carrier according to the distance between the grooves.

9. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, an endless screw concentric with said shaft, means to ensure the sliding of said screw upon the shaft and its being drawn along by same, a carrier for said screw sliding with it upon said shaft, a pinion fed by said screw and mounted in said carrier, an arm pivotally mounted with said carrier in a vertical plane along the spindle of the aforesaid pinion in perpendicular with the rotary shaft, a tool carrier spindle in parallel with the first spindle mounted upon said arm, circular cutters mounted upon the tool carrier axis, a set of gears between the tool carrier spindle and the aforesaid pinion, said set of gears being mounted upon the aforesaid arm; elastic means for pressing said cutters upon the tires and means for limiting and controlling the depth to which the cutters enter into the tires and means for rotating one of the rollers a predetermined angle after every return movement of the movable tool carrier according to the distance between the grooves.

10. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, an endless screw concentric with said shaft, means to ensure the sliding of said screw upon the shaft and its being drawn along by same, a carrier for said screw sliding with it upon said shaft, a pinion fed by said screw and mounted in said carrier; an arm pivotally mounted with said carrier in a vertical plane along the spindle of the aforesaid pinion in perpendicular with the rotary shaft, a tool carrier spindle in parallel with the first spindle mounted upon said arm, circular cutters mounted upon the tool carrier spindle, a set of gears between the tool carrier spindle and the aforesaid pinion, said set of gears being mounted upon the aforesaid arm; springs connecting said arm with the said movable carrier and placed so as to raise said arm in order to elastically press the cutters against the tires, means for limiting and controlling the depth to which the cutters enter into the tires and means for rotating one of the rollers a predetermined angle after every return movement of the movable tool carrier according to the distance between the grooves.

11. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires a cylindrical guide eccentrically mounted relatively to the cutters and having a diameter which is slightly smaller than that of said tools and means to vary the eccentricity of said guide relatively to the cutters, so as to adjust the depth of the grooves cut by said cutters, and means for rotating one of the rollers a predetermined angle after every return movement of the movable tool carrier according to the distance between the grooves.

12. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, a tool carrier spindle mounted upon said carrier transversely to the rotary shaft, means for driving said spindle from the aforesaid shaft, cutters mounted upon said spindle, a cylindrical guide in juxtaposition with said cutters and having a diameter which is slightly smaller than that of said cutters, a ring eccentrically mounted relatively to the cutters and adjustable for supporting said guide; elastic means for pressing said cutters upon the tires and means for rotating one of the rollers a predetermined angle after every return movement of the movable tool carrier according to the distance between the grooves.

13. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, an endless screw concentric with said shaft, means to ensure the sliding of said screw upon the shaft and its being drawn along by same, a carrier for said screw sliding with it upon said shaft, a pinion fed by said screw and mounted in said carrier; an arm pivotally mounted with said carrier in a vertical plane along the spindle of the aforesaid pinion in perpendicular with the rotary shaft, a tool carrier spindle in parallel with the first spindle mounted upon said arm, circular cutters mounted upon the tool carrier spindle, a set of gears between the tool carrier spindle and the aforesaid pinion, said set of gears being mounted upon the aforesaid arm; springs connecting said arm with the said movable carrier and placed so as to raise said arm in order to elastically press the cutters against the tires; a cylindrical guide in juxtaposition with the tools and having a diameter slightly smaller than that of said tools, a ring eccentrically mounted relatively to said tools for supporting said guide, said ring being adjustable in position in order to permit control by means of the guide of the depth of the grooves cut by the cutters; and means for rotating one of the rollers a predetermined angle after every return movement of the movable tool carrier according to the distance between the grooves.

14. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires, means for limiting and controlling the depth to which the cutters enter into the tires, means for rotating one of the rollers a predetermined angle after every return movement of the movable tool carrier according to the distance between the grooves and means to lock said roller when inoperative so as to prevent its rotation in both directions.

15. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires, means for limiting and controlling the depth to which the cutters enter into the tires, and a lever pivotally mounted in the path of the movable tool-carrier near the end of its return stroke, a ratchet wheel integral with one of the rollers which support the wheels provided with tires in which the grooves are to be cut, a pawl and ratchet mechanism driven by said lever to cause the forward movement of said ratchet wheel, and means for locking said roller when inoperative so as to prevent its rotating in both directions.

16. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires, means for limiting and controlling the depth to which the cutters enter into the tires and a lever pivotally mounted in the path of the movable tool carrier near the end of its return stroke, a ratchet wheel integral with one of the rollers which support the wheels provided with tires in which grooves are to be cut, a driving pawl controlling the advance movement of said ratchet wheel and a locking pawl, a second ratchet wheel integral with the first having teeth in the reverse direction with respect to the teeth of the latter, a locking pawl for said second ratchet wheel and means actuated by said lever to cause the lifting of the locking pawl of the second ratchet wheel and cause the forward movement of the first ratchet wheel.

17. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, a movable carrier sliding with a reciprocating movement upon said shaft, cutters mounted upon said carrier in parallel with the rotary shaft and rotatively driven by said shaft, elastic means for pressing said cutters upon the tires, means for limiting and controlling the depth to which the cutters enter into the tires and a lever pivotally mounted in the path of the movable cutter carrier near the end of its return stroke, a ratchet wheel integral with one of the rollers which support the wheels being operated upon, a locking pawl for said wheel and an advance pawl, a second ratchet wheel integral with the first provided with reverse teeth, a locking pawl for said second wheel, a second lever carrying the aforesaid advance pawl, said second lever being pivotally mounted upon the spindle of the ratchet wheels, a third lever carried by the second and arranged so as to be acted upon by the first lever to communicate said action to the advance pawl and thus cause the second lever to oscillate, and a fourth pivoted lever carried by the second to lift the locking pawl of the second ratchet wheel before the advance pawl completes the last portion of its stroke which produces effectively the forward movement of the first ratchet wheel and of the considered roller.

18. A machine for cutting transverse grooves in pneumatic and resilient tires mounted upon the single or multiple wheels of a motor car which comprises: a pair of parallel cylindrical rollers designed to support said wheels provided with tires and which place themselves transversely upon the latter, a rotary shaft in parallel with said two rollers and placed between them, an endless screw concentric with said shaft, means to ensure the sliding of said screw upon the shaft and its being drawn along by same, a carrier for said screw sliding with it upon said shaft, a pinion fed by said screw and mounted in said carrier; an arm pivotally mounted with said carrier in a vertical plane along the spindle of the aforesaid pinion in perpendicular with the rotary shaft, a tool carrier spindle in parallel with the first spindle mounted upon said arm, circular cutters mounted upon the tool carrier spindle a set of gears between the tool carrier spindle and the aforesaid pinion, said set of gears being mounted upon the aforesaid arm; springs connecting said arm with the said movable carrier and placed so as to raise said arm in order to elastically press the cutters against the tires, a cylindrical guide in juxtaposition with the tools and having a diameter slightly smaller than that of said tools, a ring eccentrically mounted relatively to said tools for supporting said guide, said ring being adjustable in position in order to allow of controlling by means of the guide the depth of the grooves cut by the cutters; and a lever pivotally mounted in the path of the movable cutter carrier near the end of its return stroke, a ratchet wheel integral with one of the rollers which support the wheels being operated upon, a locking pawl for said wheel and an advance pawl, a second ratchet wheel integral with the first provided with reverse teeth, a locking pawl for said second wheel, a second lever carrying the aforesaid advance pawl, said second lever being pivotally mounted upon the spindle of the ratchet wheels, a third lever carried by the second and arranged so as to be acted upon by the first lever to communicate said action to the advance pawl and thus cause the second lever to oscillate, and a fourth pivoted lever carried by the second to lift the locking pawl of the second ratchet wheel before the advance pawl completes the last portion of its stroke which produces effectively the forward movement of the first ratchet wheel and of the considered roller.

19. In a machine for cutting transverse grooves in pneumatic and resilient tires mounted upon the single or multiple wheels of a motor vehicle, means for reciprocating a treading tool carrier upon its driving shaft adapted to exert efforts strictly in parallel with said shaft, and capable of giving to the reciprocating movement a range which is greater than the width of a plurality of tires, comprising two vertical endless chains operated in parallel with the shaft on either side of the same, two opposite links of said chains being connected together by means of a rod passing through a vertical guide mounted upon the carrier, the depth of said guide being determined as a function of the vertical distance obtaining between the two sides of each chain.

20. In a machine for cutting grooves in tires, means for locking one of the feed and tire supporting rollers in both directions when inoperative in such a manner that when the vehicle is moved for coming out of the machine the wheels are securely supported upon said roller and there is no danger of said roller being broken through reaction, comprising a pawl engaging a ratchet wheel which doubles a second ratchet wheel, provided with inverted teeth relatively to those of the first ratchet wheel and actuated by a forward driving mechanism, said second ratchet wheel being itself normally provided with a locking pawl, and said forward driving mechanism comprising means for previously lifting the pawl of the first ratchet wheel which would otherwise prevent the forward movement.

21. In a tire treading machine a pair of parallel rollers for supporting the tire to be treaded, means in parallel with said two rollers and placed between them for treading said tire, means for resiliently pressing the treading means against the tire, means for limiting and controlling the depth of the tread, and means for rotating one of the rollers.

22. In a tire treading machine a pair of parallel rollers for supporting the tire to be treaded, means in parallel with said two rollers and placed between them for treading said tire, means for resiliently pressing the treading means against the tire, means for limiting and controlling the depth of the tread, means for rotating one of the rollers a predetermined amount, and means for locking said roller when inoperative so as to prevent its rotation in both directions.

23. A machine for treading tires comprising means for supporting the tire or tires to be treaded, means for moving a treading tool into operative relationship with said tire or tires for treading the same and for moving the treading tool out of operative relationship with said tire or tires upon completion of each treading operation, driving means operated by said moving means upon movement of the treading tool out of operative relationship with said tire or tires, and means actuated by said last mentioned means for moving said tire or tires relatively to said treading tool.

24. A machine for transversely treading tires, comprising means for supporting said tire or tires, means for treading said tires, means for moving said treading means in the direction of the axes of the tires and into operative treading relationship with respect to said tire or tires, means for rotating said tire or tires on their axes a predetermined angle after each treading operation, and means actuated by said moving means for actuating said rotating means.

25. In a tire treading machine, means for supporting a plurality of tires, means for treading said tires, means for moving said treading means successively into operative relationship with said tires and means for supporting said treading means against said tires to limit the depth of the tread uniformly in all the tires.

26. In a tire treading machine for vehicles, means for supporting a plurality of tires, rotatable means for treading the tires, a shaft for supporting and rotating said treading means and means for moving said treading means along said shaft successively into contact with said tires.

27. In a machine for cutting transverse grooves in pneumatic and resilient tires to increase their anti-skidding properties, power-transmitting and supporting means for a cutter carriage, comprising a drive shaft supported on the machine and having longitudinal grooves, and roller means on said carriage engaging in said grooves, said roller means being adapted to inhibit wedging of said carriage and shaft.

28. In a tire treading machine for vehicles, means for supporting a plurality of tires, rotable means for treading the tires, a shaft for supporting and rotating said treading means, means for moving said treading means along said shaft successively into contact with said tires, and means for slidably supporting said treading means at spaced points along said shaft to insure said movement with the least possible resistance.

EMILE PIQUEREZ.